(12) United States Patent
Foster et al.

(10) Patent No.: US 9,191,411 B2
(45) Date of Patent: *Nov. 17, 2015

(54) PROTECTING AGAINST SUSPECT SOCIAL ENTITIES

(71) Applicant: ZeroFOX Inc, Baltimore, MD (US)

(72) Inventors: James C. Foster, Baltimore, MD (US); Christopher B. Cullison, Wesminster, MD (US); Robert Francis, Baltimore, MD (US); Evan Blair, Baltimore, MD (US)

(73) Assignee: ZeroFOX, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/327,068

(22) Filed: Jul. 9, 2014

(65) Prior Publication Data

US 2014/0325662 A1    Oct. 30, 2014

Related U.S. Application Data

(63) Continuation-in-part of application No. 14/218,522, filed on Mar. 18, 2014, and a continuation-in-part of application No. 13/842,716, filed on Mar. 15, 2013.

(60) Provisional application No. 61/798,917, filed on Mar. 15, 2013, provisional application No. 61/799,115, filed on Mar. 15, 2013, provisional application No. 61/799,610, filed on Mar. 15, 2013.

(51) Int. Cl.
*H04L 29/06* (2006.01)

(52) U.S. Cl.
CPC ...................... *H04L 63/20* (2013.01)

(58) Field of Classification Search
USPC .......................................................... 726/22
See application file for complete search history.

(56) References Cited

U.S. PATENT DOCUMENTS

| | | | |
|---|---|---|---|
| 8,087,084 B1 | 12/2011 | Andruss | |
| 8,225,413 B1 * | 7/2012 | De et al. | 726/26 |
| 8,234,168 B1 * | 7/2012 | Lagle Ruiz et al. | 705/14.64 |
| 8,484,744 B1 * | 7/2013 | De et al. | 726/26 |
| 8,655,899 B2 | 2/2014 | Kennedy et al. | |
| 8,732,455 B2 | 5/2014 | Wong | |

(Continued)

FOREIGN PATENT DOCUMENTS

CN    102662950 A  *  9/2012

OTHER PUBLICATIONS

Detecting social network profile cloning|http://ieeexplore.ieee.org/stamp/stamp.jsp?tp=&arnumber=5766886&tag=1|pp. 295-300|2011|Kontaxis et al.*
A Community Based Algorithm for Deriving Users' Profiles|http://ieeexplore.ieee.org/stamp/stamp.jsp?tp=&arnumber=6425752|Tchuenteet al.| 2012|pp. 266-273.*
A Framework for Computing the Privacy Scores of Users in Online Social Networks|http://cs-people.bu.edu/evimaria/papers/tkdd-pr.pdf|Liu et al.|Dec. 2010|pp. 1-30.*
Statistics-based Overload Control against Distributed Denial-of-Service Attacks|http://infocom2004.ieee-infocom.org/Papers/54_2.PDF|Kim et al.|2004|pp. 1-11.*
Office Action issued in U.S. Appl. No. 13/842,716 on Aug. 13, 2014, 12 pages.
Office Action issued in U.S. Appl. No. 14/218,522 on Jul. 8, 2014, 10 pages.
Office Action issued in U.S. Appl. No. 14/445,274 on Sep. 11, 2014, 11 pages.

(Continued)

*Primary Examiner* — Mahfuzur Rahman
(74) *Attorney, Agent, or Firm* — Fish & Richardson P.C.

(57) ABSTRACT

A method includes identifying data on a social network that is associated with a suspect social entity, and determining one or more characteristics of the identified data. A reference to the identified data is generated for each of the one or more characteristics. One or more of the generated references are compared to one or more stored references, where the one or more stored references are associated with a protected social entity. A profile score for the suspect social entity is determined based on the comparison. Determining the profile score includes identifying a match between one or more of the generated references and one or more of the stored references.

22 Claims, 8 Drawing Sheets

(56) References Cited

U.S. PATENT DOCUMENTS

| | | | |
|---|---|---|---|
| 8,782,080 B2 | 7/2014 | Lee et al. | |
| 8,782,217 B1 | 7/2014 | Arone | |
| 8,909,646 B1 | 12/2014 | Fabrikant et al. | |
| 9,027,134 B2 | 5/2015 | Foster et al. | |
| 9,055,097 B1 | 6/2015 | Foster et al. | |
| 2002/0073086 A1 | 6/2002 | Thompson | |
| 2006/0168066 A1 | 7/2006 | Helsper et al. | |
| 2008/0177834 A1* | 7/2008 | Gruhl et al. | 709/204 |
| 2008/0196099 A1 | 8/2008 | Shastri | |
| 2008/0262877 A1 | 10/2008 | Hargroder | |
| 2008/0288382 A1 | 11/2008 | Smith | |
| 2008/0300964 A1 | 12/2008 | Raghunandan | |
| 2010/0174813 A1* | 7/2010 | Hildreth et al. | 709/224 |
| 2010/0241621 A1 | 9/2010 | Randall | |
| 2011/0145279 A1* | 6/2011 | Chunilal | 707/769 |
| 2011/0191200 A1 | 8/2011 | Bayer et al. | |
| 2011/0276396 A1* | 11/2011 | Rathod | 705/14.49 |
| 2012/0030732 A1 | 2/2012 | Shaty | |
| 2012/0047560 A1 | 2/2012 | Underwood et al. | |
| 2012/0047581 A1 | 2/2012 | Banerjee et al. | |
| 2012/0159647 A1 | 6/2012 | Sanin et al. | |
| 2012/0167231 A1 | 6/2012 | Garcia et al. | |
| 2012/0191594 A1* | 7/2012 | Welch et al. | 705/38 |
| 2012/0296845 A1* | 11/2012 | Andrews et al. | 705/36 R |
| 2013/0110802 A1* | 5/2013 | Shenoy et al. | 707/706 |
| 2013/0139236 A1 | 5/2013 | Rubinstein | |
| 2013/0268357 A1* | 10/2013 | Heath | 705/14.53 |
| 2013/0339186 A1* | 12/2013 | French et al. | 705/26.35 |
| 2014/0067656 A1 | 3/2014 | Cohen Ganor et al. | |
| 2014/0123632 A1 | 5/2014 | Shibuya et al. | |
| 2014/0129632 A1 | 5/2014 | Sutton et al. | |
| 2014/0129942 A1* | 5/2014 | Rathod | 715/720 |
| 2014/0137257 A1 | 5/2014 | Martinez et al. | |
| 2014/0208424 A1* | 7/2014 | Hudack et al. | 726/23 |
| 2014/0337972 A1 | 11/2014 | Foster et al. | |
| 2014/0337973 A1 | 11/2014 | Foster et al. | |

OTHER PUBLICATIONS

Office Action issued in U.S. Appl. No. 14/445,203 on Sep. 18, 2014, 8 pages.

Office Action issued in U.S. Appl. No. 14/218,522 on Dec. 31, 2014, 13 pages.

Notice of Allowance issued in U.S. Appl. No. 14/445,203 on Feb. 11, 2015, 7 page.

Office Action issued in U.S. Appl. No. 14/566,971 on Feb. 13, 2015, 23 pages.

Office Action issued in U.S. Appl. No. 13/842,716 on Mar. 23, 2015, 22 pages.

Office Action issued in U.S. Appl. No. 14/445,274 on Apr. 27, 2015, 18 pages.

"How do I report a fake account that's pretending to be me?," Dec. 2012, Retrieved from the Internet <URL: web.archive.org/web/20121226111810/https://www.facebook.com/help/174210519303259>, retreived on Aug. 12, 2015, 1 page.

Socialimpostor.com, May 2012; Retrieved from the Internet < URL: web.archive.org/web/20120504213219/http://www.socialimpotor.com/>, retreived on Aug. 12, 2015, 3 pages.

Office Action issued in U.S. Appl. No. 14/690,804 on Aug. 27, 2015, 34 pages.

Office Action issued in U.S. Appl. No. 14/445,274 on Sep. 11, 2015, 16 pages.

Office Action issued in U.S. Appl. No. 14/566,971 on May 29, 2015, 18 pages.

* cited by examiner

FIG. 7

PROTECTING AGAINST SUSPECT SOCIAL ENTITIES

CROSS-REFERENCE TO RELATED APPLICATIONS

This application is a continuation-in-part of U.S. patent application Ser. No. 14/218,522, filed Mar. 18, 2014 and titled "Social Network Scanning," which claims the benefit of U.S. Provisional Application No. 61/798,917, filed Mar. 15, 2013 and titled "Social Threat Assessment," U.S. Provisional Application No. 61/799,115, filed Mar. 15, 2013 and titled "Social Threat Scores," and U.S. Provisional Application No. 61/799,610, filed Mar. 15, 2013 and titled "Social Threat Alerts." This application is also a continuation-in part of U.S. patent application Ser. No. 13/842,716, filed Mar. 15, 2013 and titled "Social Threat Management." All of these prior applications are incorporated by reference in their entirety.

FIELD

The present application relates to computer security.

BACKGROUND

Traditional approaches to combatting cyber threats focus on securing endpoints and networks through reactive security measures that are focused on securing computing devices. Anti-virus programs, for example, can be used to detect malicious software associated with local system-level attacks (e.g., a virus attached to an email) and, when defenses have already been breached, to quarantine dangerous files that are detected within a computer system. Firewalls and other edge security devices can be used to establish a perimeter around sensitive systems by controlling the passage of information between networks, so as to reduce the risk of unauthorized access Modern cyber threats, however, evolve alongside computer technology, and attackers can be expected to leverage whatever means are available in order compromise or bypass traditional defenses. The development and expansion of social media, for instance, has introduced significant information security risk to both individuals and organizations. These risks include targeted social-based cyber-attacks, fraud, impersonations, and social engineering. The evolving risk necessitates security technology that is predictive rather than reactive in nature, and that identifies dormant maliciously-minded entities before they can initiate an attack.

SUMMARY

In one aspect, data on a social network that is associated with a suspect social entity is identified, and one or more characteristics of the identified data are determined. A reference to the identified data is generated for each of the one or more characteristics, and the one or more generated references are compared to one or more stored references, where the one or more stored references are associated with a protected social entity. A profile score for the suspect social entity is determined based on the comparison, where determining the profile score includes identifying a match between one or more of the generated references and one or more of the stored references.

In another aspect, the suspect social entity is an imposter of the protected social entity. The profile score for the suspect social entity is compared to a threshold and a security action is initiated if the profile score exceeds the threshold. Initiating the security action includes generating an alert and providing the alert to the protected social entity. The alert identifies the suspect social entity. In yet another aspect, providing the alert to the protected social entity includes providing computer-based alerts to the protected social entity. Providing computer-based alerts to the protected entity may include emailing the protected social entity. Providing computer-based alerts to protected social entity may include providing a web-based alert to the protected social entity.

In yet another aspect, the alert indicates fraud, impersonation, or social engineering. The one or more characteristics of the data are selected from the group consisting of name, date of birth, gender, location, email address, education, and organization.

In a further aspect, the one or more characteristics include an image, and generating a reference to the image includes deriving data from the image. Deriving data from the image may include hashing the image for comparison or determining one or more facial characteristics of an individual included in the image.

Other implementations of these aspects include corresponding systems, apparatus, and computer programs, configured to perform the described techniques, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 6-8 are illustrations of social threat protection platform.

Like reference symbols in the various drawings indicate like elements.

DETAILED DESCRIPTION

Predictive and active social risk management technology reduces the risks posed to individuals and enterprises by cyber threats that target and exploit the social vector. Traditional approaches to combating cyber threats focus on endpoint and perimeter security, providing reactive protection through, for example, anti-virus software, email and web gateways, firewalls, and intrusion detection systems. Cyber threats have evolved, however, and attacks now leverage social network and social media communications as means of bypassing traditional protections. The evolving risk necessitates security technology that is predictive and active rather than reactive in nature, and that identifies dormant malicious entities before they can launch an attack.

In more detail, an active social risk defense engine that identifies live attacks can be paired with a predictive analysis framework that identifies dormant risks before attacks occur. The predictive analysis framework can be driven by a scoring algorithm that can determine and score a risk posed by a social entity by analyzing characteristics of a target URL, file, or social communication that is associated with the social entity. The framework can analyze the target via a variety of analytical factors, and can dynamically determine which factors to employ, where each factor employed by the algorithm is associated with one or more characteristics of the target and/or social entity. Based on the result of analysis, the algorithm can score the risk posed by the social entity, and can recommend or take appropriate security action based on a comparison of the social risk score to a social risk threshold.

Figure 1:
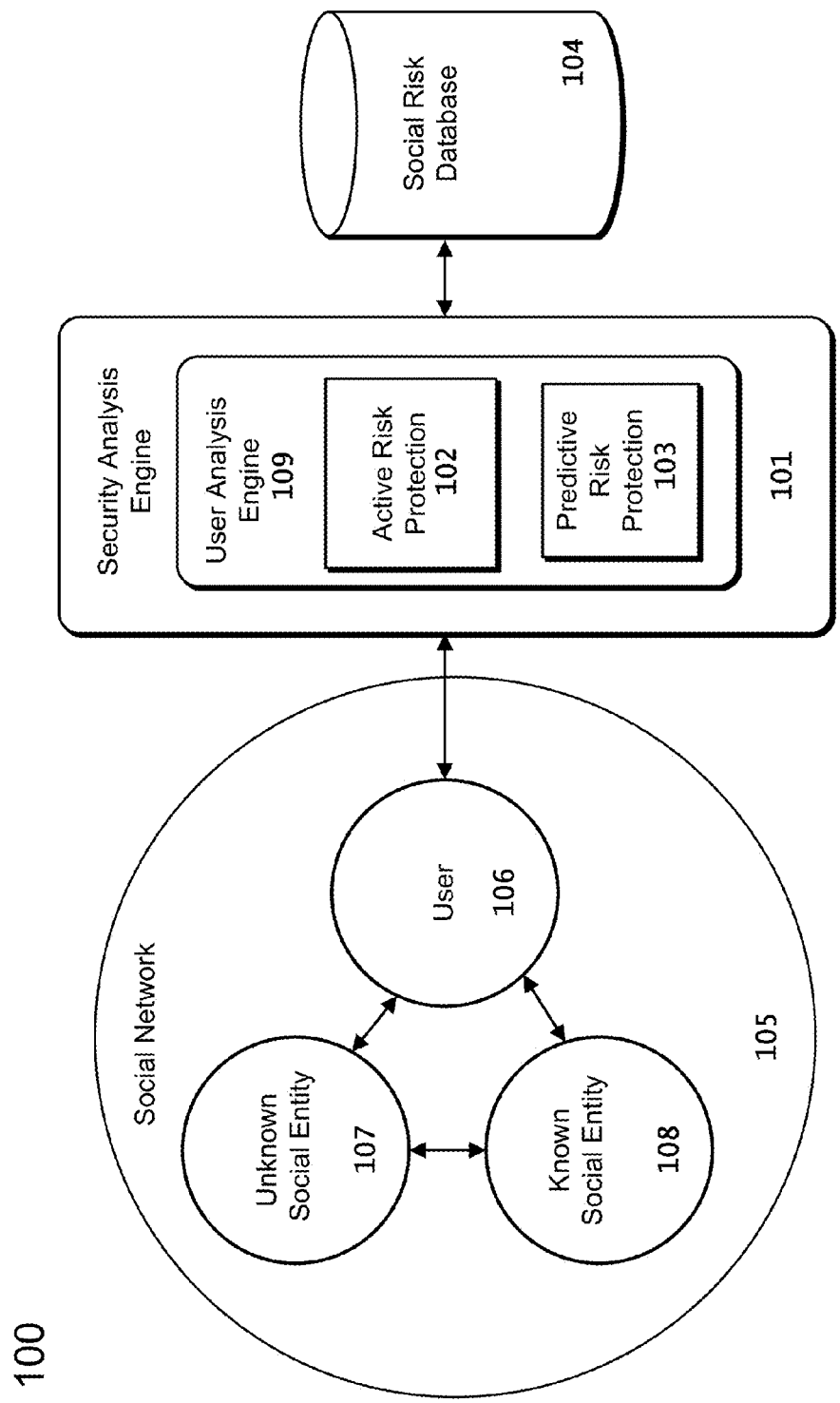
FIG. 1 is a diagram of an example of a system that provides security against social risks.

FIG. 1 is a diagram of an example of a system that provides security against social risks. A risk could be a threat posed by a social entity. The system 100 includes a security analysis engine 101 that includes a user analysis engine 109. The user analysis engine 109 includes an active risk protection module 102 and a predictive risk protection module 103, as well as a social risk database 104. The security analysis engine 101, the user analysis engine 109, and the social risk database 104 may be used to provide security against risks arising from social network 105, such as risks posed to a user 106 by unknown social entity 107 and/or known social entity 108. Security analysis engine 101, social risk database 104, and user 106 may be connected through a network, such as the Internet, and user 106, unknown social entity 107 and known social entity 108 may communicate or may otherwise be connected through social network 105. The active risk protection module 102 and the predictive risk protection module 103 of the user analysis engine 109 may be implemented using a single computer, or may instead be implemented using two or more computers that interface through the network. Similarly, security analysis engine 101 and social risk database 104 may be implemented using a single computer, or may instead be implemented using two or more computers that interface through the network. In some implementations, the user analysis engine 109 may be implemented on a separate computer that is in communication through the network to the security analysis engine 101.

Active risk protection module 102 of user analysis engine 109 may be used to protect user 106 from immediate security risks by, for example, thwarting live attacks. In more detail, either of unknown social entity 107 or known social entity 108 may attempt to communicate with, or connect to, user 106. In response to an attempt by a social entity at communication or connection with user 106, active risk protection module 102 may identify a URL, file, or social communication associated with the social entity, and may initiate a security action after performing an analysis related to the identified URL, file, or social communication.

In more detail, Uniform Resource Locators function as addresses that are used, for example, to specify the location of documents on the World Wide Web. An individual URL, which may be referred to as a web address, is a specific character string that references (i.e. provides the location of) a resource. For example, http://zerofox.com references the homepage of ZeroFox, a cyber-security technology company. Risk protection module 102 may identify an association between a social entity and a URL when, for example, the source of the URL is a social communication originating with the social entity, or when the URL references a social network profile of the social entity. A social communication may be, for example, a post on a social network, or a message sent between users of a social network.

Risk protection module 102 may determine, based on the URL associated with the social entity attempting to connect to or communicate with user 106, that the social entity is a known entity, such as known social entity 108. The determination may involve, for example, identifying an entry in social risk database 104 that is associated with the social entity, the entry including the URL and a social risk score for the social entity. Alternatively, risk protection module 102 may determine, based on, for example, an absence of an entry associated with the social entry in social risk database 104, that the social entity is an unknown entity, such as unknown social entity 107. The determination may involve, for example, identifying an identity as a known entity only for a specific period of time. Prior to the expiration of the specified period of time, a social entity that was scanned and identified as a known entity will be considered to be a known entity, while after the expiration it will again be considered to be an unknown entity.

In response to determining that the social entity attempting to connect to or communicate with user 106 is a known entity, risk protection module 102 may identify the social risk score that is associated with the social entity, and may recommend or take appropriate security action based on a comparison of the social risk score to a social risk threshold.

A social risk score is a calculation of the security risk associated with a target URL, file, or social communication and thus, the risk posed by a scored social entity that is associated with the target. Social risk scores may be determined by the predictive risk protection module 103 of security analysis engine 101, which may proactively identify cyber threats, before attacks occur. The predictive risk protection module 103 may be driven by a scoring algorithm that can determine and score a risk posed by a dormant social entity by analyzing a target URL, file, or social communication that is associated with the social entity, prior to a user's engagement with the social entity. The social risk scores determined by the predictive protection module 103 may be associated with corresponding URLs in entries that are generated by security analysis engine 101, and that are stored in social risk database 104.

A variety of analytical factors can be used by the scoring algorithm to analyze a target URL, file, or social communication, where each factor employed by the algorithm is associated with one or more characteristics of the target and/or the social entity associated with the target. The characteristics of the target and/or social entity that may be analyzed by the scoring algorithm include contextual, lexical, visual, audio, profile, URL, file, network, destination content, domain, host, and application characteristics. The algorithm may analyze, for example, content of a resource that is referenced by a target URL, such as a social network profile of the social entity that is referenced by the target. The algorithm may analyze the content or function of a target file, and/or the type, size, or attributes of the target file.

The algorithm may dynamically determine which factors to employ in analyzing a target URL, file, or social communication. The algorithm may, for example, assign a confidence level to a social risk score that is determined based on a first set of factors and, if the confidence level falls below a confidence threshold, the algorithm may refine the social risk score based on one or more additional sets of factors, until the confidence level assigned to the social risk score meets or exceeds the confidence threshold.

A social risk threshold represents a level of tolerance for risk, and a particular social risk threshold may be associated with a particular user, organization or entity. Security analysis engine 101 may assign a social risk threshold to a user, organization, or entity based on, for example, input from the user, or one or more characteristics of the user, user's social network activity, and/or a collection of users associated with the organization or entity.

When the risk protection module 102 determines that the social entity attempting to connect to, to follow, or communicate with user 106 is a known entity, the risk protection module 102 may identify the social risk score that is associated with the social entity based on entry in social risk database 104, and may recommend or take appropriate security action based on a comparison of the social risk score to the user 106's social risk threshold. The risk protection module 102 may, for example, alert the user to the potential risk posed by the social entity, and/or block the social entity's communication or connection attempt.

When, on the other hand, the risk protection module 102 determines that the social entity attempting to connect to or communicate with user 106 is an unknown entity, the risk protection module 102 may use the scoring algorithm to generate a social risk score for the unknown entity, and may store the generated social risk score in a new entry in the social risk database 104, the new entry including the URL associated with the unknown entity and/or characteristics of the social entity or user. The risk protection module 102 may then recommend or take appropriate security action based on a comparison of the social risk score to the user 106's social risk threshold.

The predictive risk protection module 103 may, in addition to proactively determining social risk scores, alert the user 106 to risks posed by other social entities based on entries in social risk database 104. The predictive risk protection module 103 may, for example, alert the user 106 to risks posed by social entities with which user 106 has had no contact. For example, the risk protection module 103 may identify a connection between user 106 and known social entity 108, in addition to a connection between known social entity 108 and another social entity in social network 105. An entry in social risk database 104 may indicate that the social risk score for known social entity 108 falls below user 106's social risk threshold, but another entry may indicate that the social risk score associated with the social entity with which user 106 has had no contact exceeds user 106's social risk threshold. In cases like this, the predictive risk protection module 103 may, based on a comparison between a social entity's social risk score and a user's social risk threshold, initiate a security action relating to the social entity, even before the social entity attempts to connect to or communicate with the user.

Figure 2:
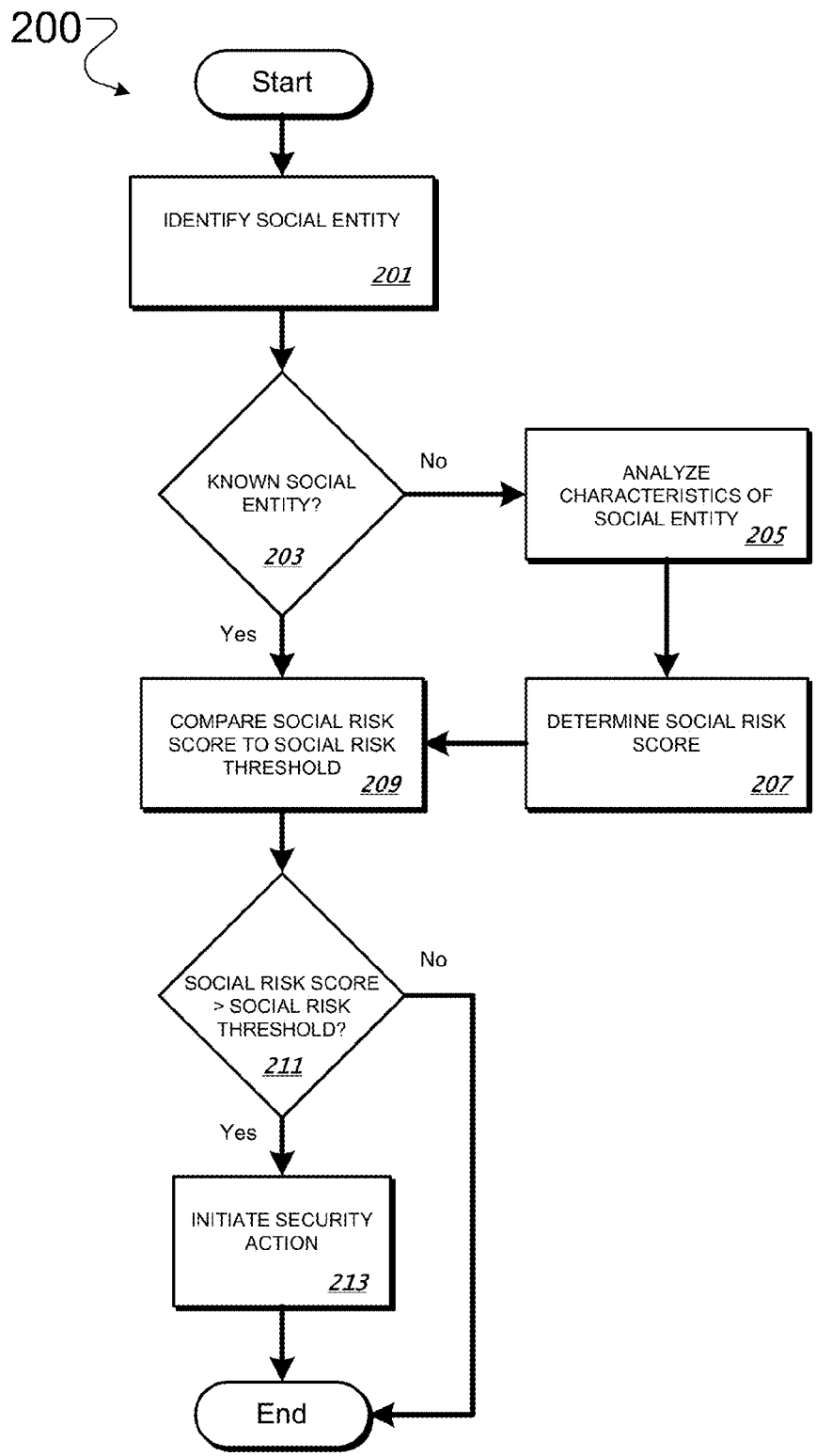
FIG. 2 is a flowchart of an example of a process for determining a social risk score for a social entity, and for taking an appropriate security action based on the determined social risk score.

FIG. 2 is a flowchart of an example of a process 200 for determining a social risk score for a social entity, and for taking an appropriate security action based on the determined social risk score. The process 200 may be implemented, for example, using system 100, although other systems or configurations may be used. In such an implementation, one or more parts of the process may be executed by security analysis engine 101, which may interface with other computers through a network. Security analysis engine 101 may retrieve data involved in the process, such as data used in assessing a security risk posed by a social entity, from one or more local or remote data sources, such as social risk database 104 and user 106.

Process 200 begins when security analysis engine 101 identifies a social entity based on a URL that is associated with the social entity (201). The social entity may be identified, for example, by active risk protection module 102 of the user analysis engine 109 in response to an attempt by the social entity to connect to or to communicate with user 106.

Alternatively, the social entity may be identified by predictive risk protection module 103, as it proactively seeks out dormant risks.

After identifying the social entity, security analysis engine 101 may determine whether the social entity is a known entity, or is instead an unknown entity (203). In some implementations, the security analysis engine 101 or the user analysis engine 109 may determine whether the social entity is a known entity or an unknown entity. If the social entity is a known entity, the security analysis engine 101 may compare the social risk score that is associated with the social entity in social risk database 104 to a social risk threshold that is associated with the user 106 (209), and may determine whether the social risk score exceeds the social risk threshold (211). If the social risk score that is associated with the social entity exceeds the social risk threshold that is associated with the user 106, the security analysis engine may initiate an appropriate security action (213). If, however, the social risk score that is associated with the social entity does not exceed the social risk threshold that is associated with the user 106, the security analysis engine may instead take no action.

If the social entity is an unknown entity, the security analysis engine 101 may analyze characteristics of the social entity, and/or of a target URL, file, or social communication that is associated with the social entity (205), in order to determine a social risk score (207). The security analysis engine 101 may generate an entry in the social risk database 104 that contains both the social risk score and one or more characteristics of the social entity and/or the target. The security analysis engine 101 may then compare the social risk score that is associated with the social entity to a social risk threshold that is associated with the user 106 (209), and may determine whether the social risk score exceeds the social risk threshold (211). If the social risk score that is associated with the social entity exceeds the social risk threshold that is associated with the user 106, the security analysis engine may initiate an appropriate security action (213). If, however, the social risk score that is associated with the social entity does not exceed the social risk threshold that is associated with the user 106, the security analysis engine may instead take no action.

Figure 3:
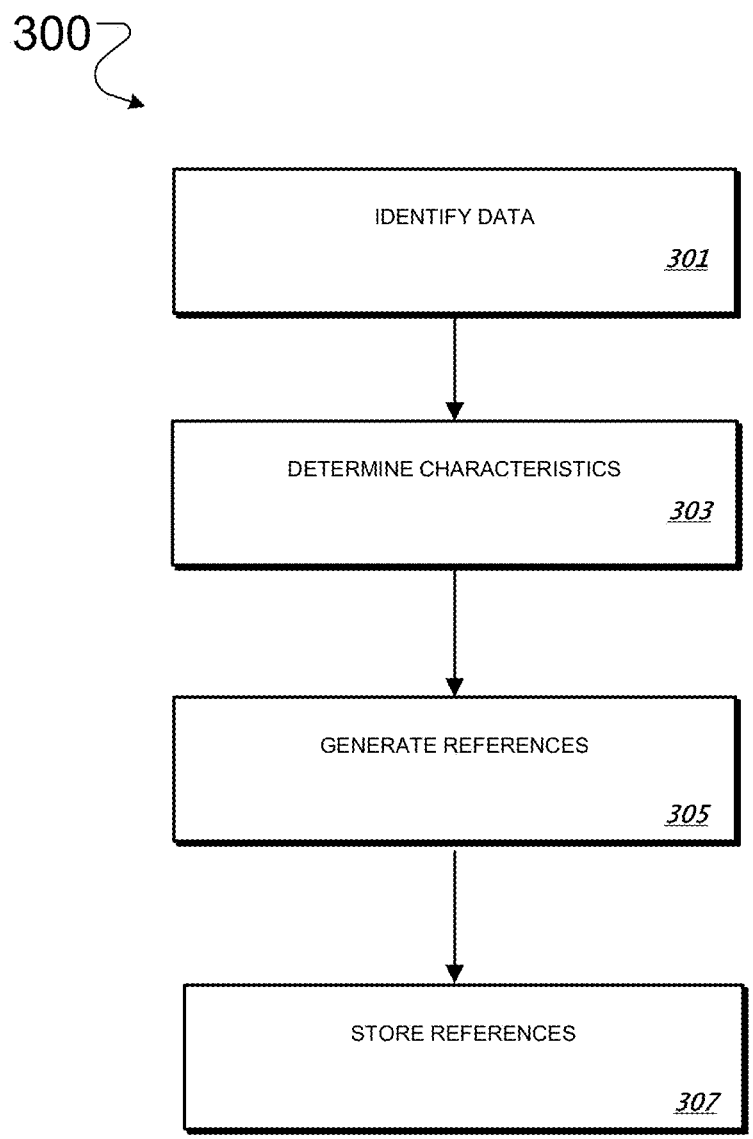
FIG. 3 is a flowchart of an example process for identifying data in a social network that is associated with a social entity.

FIG. 3 is a flowchart of a process 300 for identifying data in a social network that is associated with a social entity. The process 300 may be implemented, for example, using system 100, although other systems or configurations may be used. In such an implementation, one or more parts of the process may be executed by security analysis engine 101. In such an implementation, one or more parts of the process may be executed by security analysis engine 101, which may interface with other computers through a network. Security analysis engine 101 may identify and retrieve data involved in the process, such as data that is associated with a social entity, from one or more local or remote data sources, such as social network 105. Security analysis engine 101 may store data identified and retrieve in the process in one or more local or remote databases, such as social risk database 104. In some implementations, the user analysis engine 109 may identify and retrieve data involved in the process.

The security analysis engine 101 may be configured to actively scan one or more social networks for data that is available and that pertains to a social entity, and may be further configured to receive additional data that is available from other sources. In some implementations, the active scanning of the one or more social networks for data may be implemented by the user analysis engine 109.

A social entity may be, in some instances, a user of a social network, such as an individual or a corporation. John Doe, for example, may maintain a Facebook profile, in which case John Doe would be identified by security analysis engine 101 as a social entity, and information that is available through John Doe's profile, including pictures, textual content, posts, and links, would be associated with John Doe. Similarly, if an Acme, Inc., maker of fine widgets, maintains a Twitter account for purposes of public relations, Acme, Inc. would be identified by security analysis engine 101 as a social entity, and information tweeted by representatives of Acme, Inc. could be associated with both Acme, Inc. and its representatives. In some instances, however, a social entity may be an individual who has generated a fake profile page spoofing another social entity. For example, a malicious individual or bot could establish a second, fake, Acme, Inc. Twitter profile but, having been identified as a fake, the profile would be associated with the social entity that is the malicious individual or bot, rather than with Acme, Inc. In other instances, the social entity may be a software application that runs automated tasks in relation to a social network. A social network may harbor, for example, a malicious bot that is configured to maintain a social network profile for purposes of phishing user data, or spreading computer viruses. The malicious bot would also be identified by security analysis engine 101 as a social entity, and information on or related to the malicious bot's profile would be associated with the malicious bot.

Data that is identified by security analysis engine 101 through the process of scanning a social network may include, for example, information that is available through a social entity's profile, information that is available to security analysis engine 101 by virtue of an agreement with the social entity, and information that is provided to security analysis engine 101 by the social network or by another third party. A hyperlink that is associated with a social entity, for example, may be identified through the social entity's profile if the profile contains a reference to the hyperlink. The hyperlink may also be identified through a social network communication, such as a message, post, or tweet, if the social network communication is a source of the hyperlink.

The security analysis engine 101 may be further configured to determine one or more characteristics of identified data. Characteristics of an identified hyperlink may include, for example, URL, network, destination content, domain, and host. Characteristics of identified content that is associated with a social entity, such as the text of a post by the social entity or associated files may include, for example, contextual, lexical, visual, or audio indicators. Security analysis engine 101 may generate references to identified data, and to characteristics of identified data. Once generated, the references may be stored in, for example, social risk database, for later use by the security analysis engine 101. The stored references may be used, for example, to evaluate and score a risk posed by a social entity.

Process 300 begins when a scanner identifies data on one or more social networks that is associated with a social entity (301). The scanner may be hosted at an entity that is different and separate from the security analysis engine 101. Alternatively, the scanner may be part of, or otherwise associated with, the security analysis engine 101, and may be integrated into the system 100 illustrated in FIG. 1.

Security analysis engine 101 may, for example, actively scan social networks for publicly or authorized available information. Security analysis engine 101 may additionally identify information that is associated with a social entity and that is received through an application programming interface (API). The type of data that is scanned from social networks may vary depending on the social network. For some social networks, security analysis engine 101 may only have access to publicly available information, in which case the scan of the social network would be limited to identifying and/or acquiring this publicly available data. Other social networks may instead recognize security analysis engine 101 as an authorized user (or as otherwise having elevated security status), and may therefore provide security analysis engine 101 with access to additional information that is not available to the general public. The different social networks may contain different types of data associated with a user profile. The security analysis engine 101 accesses each social network for only data that is available for that network. The security analysis engine 101 would not request data from a social network that is not maintained by the social network. For example, the security analysis engine may scan a LinkedIn profile, instead of a Twitter profile, for employment information.

Security analysis engine 101 may be configured to scan for only a subset of the data that is available on or through a social network. Scanning may be limited, for example, to popular pages or user profiles on a social network, such as popular Facebook profiles, and/or popular Twitter hash tags. Security analysis engine 101 may also be configured to scan social networks for any information associated with a particular individual, enterprise, or company. Security analysis engine 101 may, for example, be configured to scan the LinkedIn profiles of all employees of Acme, Inc. In some implementations, the system may constantly scan one or more social networks for data. In other implementations, the system may only scan during a set time period.

The security analysis engine 101 may determine one or more characteristics of identified data (303). Characteristics that may be determined for identified data may vary depending on the type of data. Identified data that is associated with a social entity may include, for example, the social entity's user name, history, contacts, and associated links and content. For an individual, the identified data may also include demographic information such as age, gender, location, and place of employment. Characteristics of a post may include, for example, language, timestamp, URL, domain or other information and metadata.

In some instances, identified data may include data that is correlated. Audio/visual (A/V) content data and textual data may, for example, be correlated in an instance in which the text describes the NV data. In another example, content data may be a URL to a link the text data may include a user profile that is associated with the link. For example, the identified data may include a link to the Acme, Inc. website that was posted by John Doe, an avid fan or detractor of Acme, Inc. In this example, the posted content or the link to the Acme, Inc. website may be determined to be characteristics of the identified data, in addition to characteristics that include correlations between data identified from John Doe's profile.

Following determination of the characteristics of the identified data, security analysis engine 101 may generate, for each of the one or more characteristics, a reference to the characteristic or to the identified data to which the characteristic pertains (305). Security analysis engine 101 may, for instance, create a reference to a characteristic by tagging the characteristic. The characteristic may be tagged, for example, with a keyword or term that describes the characteristic.

Security analysis engine 101 may store references to identified data in one or more databases for later analysis (307). References to identified data that is associated with a social entity may be stored, for example, in social risk database 104, and may later be accessed to generate a social risk score for the social entity. Storage of references to identified data rather than the identified data itself may minimize the amount of memory needed to assess and to act on risks posed by social entities. In some implementations, however, both references to identified data and the identified data itself may be stored. In some implementations, all references to the one or more characteristics of the identified data associated with the social entity are stored while, in others, only a select group of references are stored.

Figure 4:
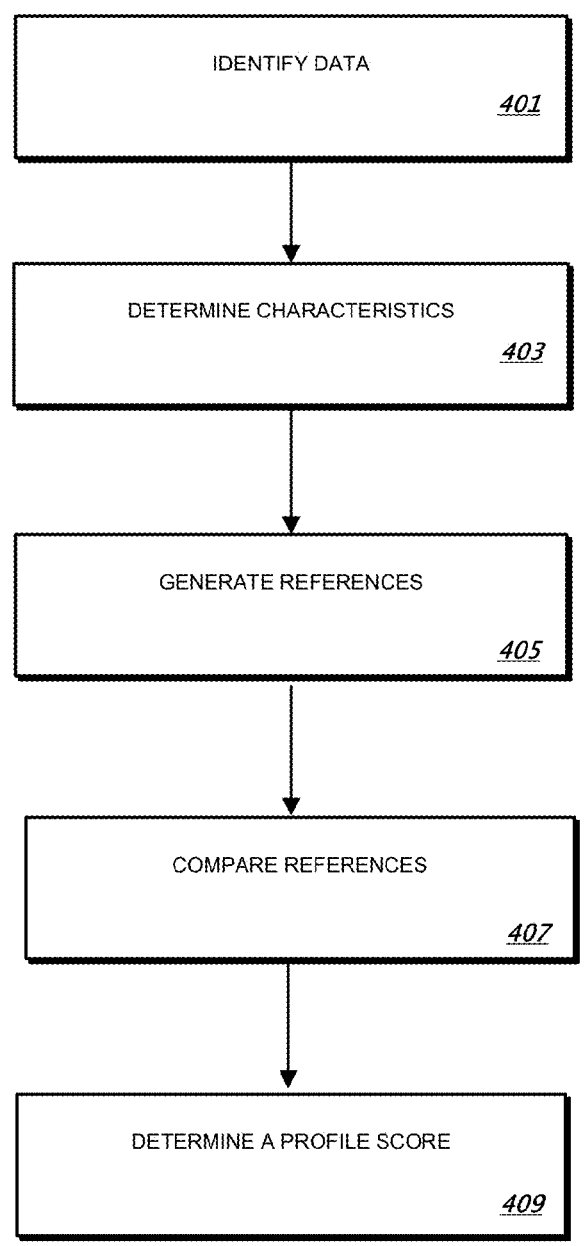
FIG. 4 is a flowchart of an example process for determining a profile score for a suspect social entity.

FIG. 4 is a flowchart of a process 400 for determining a profile score for a suspect social entity. The process 400 may be implemented, for example, using system 100, although other systems or configurations may be used. In such an implementation, one or more parts of the process may be executed by security analysis engine 101, which may interface with other computers through a network. In some implementations, the process may be executed by the user analysis engine 109. The user analysis engine 109 may be configured to identify social entities on a social network that are suspected of impersonating a protected social entity, which may be an individual or an organization. The user analysis engine 109 may identify imposters by determining profile scores that are associated with suspect social entities and by comparing the profile scores with a threshold profile score. The profile score for a particular suspect social entity may be determined based on a comparison of data that is associated with the suspect social entity to data that is associated with a protected social entity.

In more detail, the user analysis engine 109 may scan a protected social entity's profile on a social network for identifying information that may be unique to the protected social entity. The user analysis engine 109 may, for example, scan the protected entity's profile page for data including a profile picture, name, date of birth, place of employment, education, and location, etc. The user analysis engine 109 may then actively scan one or more social networks to identify social entities that may be impersonating the protected social entity. The user analysis engine 109 may identify an impersonating social entity by assessing how similar data that is associated with a suspect social entity is to the data that is associated with the protected social entity.

A protected social entity may be an individual who seeks protection from a social threat protection tool, such as user analysis engine 109. Jane Roe, for example, may seek to protect her personal account from suspect social entities that may attempt to use her personal information to generate one or more fraudulent accounts on social media websites. In some examples, a protected social entity may be an enterprise or a company, Acme Inc., for example, may be a social entity that seeks to protect its corporate profiles on social websites, and to monitor other social entities on social websites that claim to be employed or otherwise affiliated with Acme, Inc.

A suspect social entity that is an imposter may generate and maintain fraudulent profiles that impersonate accounts of other social entities on social media websites. A fraudulent profile may be generated and maintained by an individual. For example, John Doe may impersonate Jane Roe by generating a fake profile page for Jane Roe on LinkedIn, using an image of Jane obtained from the Internet, unbeknownst to Jane Ford herself. In other examples, one or more a fraudulent profiles may be generated and maintained by a malicious bot on a social media website. A suspect social entity may be a social entity that is potentially associated with a fraudulent social network profile or account. A suspect social entity may also be a social entity that potentially falsely claims to be affiliated with an enterprise or association. John Doe, for example, may falsely list ZeroFox as an employer. A suspect social entity may generate an imposter profile of a protected social entity on a social network. The imposter profile may include the exact information from the real profile page of the protected social entity. For example, the imposter profile may include the protected social entity's profile picture, date of birth, location, place of employment and any other additional profile information.

In some instances, an imposter profile may not initially post any malicious malware on behalf of the protected social entity, or otherwise perform actions that would themselves constitute threats to computer security. In these instances, the imposter may simply impersonate the protected entity through a social profile and messaging, and through that impersonation may connect with followers of the genuine protected social entity. Through this behavior, the imposter may misrepresent positions of the protected social entity or otherwise damage its interests and reputation. Moreover, the impersonator may exploit the trust of the protected social entity's followers by later engaging in malicious behavior that targets the followers.

The user analysis engine 109 may be configured to take security actions in response to the identification of a fraudulent profile. User analysis engine 109 may, for example, flag identified fraudulent profiles that have been generated to impersonate the profile of a protected social entity. The flagged fraudulent profiles may also be monitored to identify any malicious actions. A fraudulent profile may, for example, be maintained on a "watch list" of social media profiles that should be monitored for malicious acts. The fraudulent profile may be an imposter of a protected social entity. The imposter may or may not post malicious content on behalf of the protected security. The security analysis engine may identity any imposters of the protected social entity. A protected social entity may be alerted to posts or other actions carried out by suspect social entities that have been identified as impersonators of the protected social entity. For example, if malware is posted to a fraudulent LinkedIn page run by a social entity that is impersonating Jane Roe, Jane may be alerted of the action. Similarly, if Acme, Inc. is a protected social entity, Acme, Inc. may receive alerts if a fraudulent profile distributes malware in the company's name.

Process 400 begins when a scanner identifies data on one or more social networks that is associated with a suspect social entity (401). The scanner may be hosted at an entity that is different and separate from the security analysis engine 101. Alternatively, the scanner may be part of, or otherwise associated with, the security analysis engine 101, and may be integrated into the system 100 illustrated in FIG. 1. In some implementations, the process may be executed by the user analysis engine 109.

Security analysis engine 101 may actively scan social networks for publicly available information, and/or information that is available to security analysis engine 101 by special authorization. As described earlier, the type of data that is scanned from social networks may vary depending on the social network. For some social networks, security analysis engine 101 may only have access to publicly available information, in which case the scan of the social network would be limited to identifying and/or acquiring this publicly available data. Other social networks may instead recognize security analysis engine 101 as an authorized user (or as otherwise having an elevated security status), and may therefore provide security analysis engine 101 with access to additional information that is not available to the general public.

The security analysis engine 101 may determine one or more characteristics of identified data (403). Characteristics that may be determined for the identified data may vary depending on the type of data identified. Identified data that is associated with a suspect social entity may include, for example, the suspect social entity's user name, profile picture, date of birth, gender, location, email address, education, and organization. The identified data associated with the suspect social entity may also include data about the friends, followers or connections of the suspect social entity. In some implementations, the security analysis engine may determine a rating for the friends or followers of a suspect entity. In these implementations, the profile score of the social entity may be affected by the rating determined for the friends or followers of the social entity. For example, the security analysis may rate the friends or followers of an entity as high risk, based on a large number of the friends or following being associated with malicious acts.

Following a determination of the characteristics of the identified data, security analysis engine 101 may generate, for each of the one or more characteristics, a reference to the characteristic or to the identified data to which the characteristic pertains (405). Security analysis engine 101 may, for instance, create a reference to a characteristic by tagging the characteristic. The characteristic may be tagged, for example, with a keyword or term that describes the characteristic.

References to characteristics of identified data that is associated with a protected social entity may be generated when the security analysis engine 101 scans social websites. The security analysis engine 101 may scan a protected social entity's profile, for example, for data including the protected social entity's user name, profile picture, date of birth, gender, location, email address, education, and organization. In some examples, the protected social entity may provide additional images other than the entity's current profile picture. In these examples, the security analysis engine 101 may store a reference to the additional images. When the protected social entity is a popular individual or celebrity, the security analysis engine 101 may acquire additional images from websites such as Wikipedia, and store references to these images. In some other examples, the protected social entity may be an enterprise or company that seeks to protect the use of an emblem or logo that is associated with the enterprise or company. The security analysis engine 101 may, in these examples, store references to images that are associated with the company.

The security analysis engine 101 may store the references to the identified data in a database. Storage of references to identified data rather than the identified data itself may minimize the amount of memory needed to assess and to act on risks posed by social entities. In some implementations, however, both references to identified data and the identified data itself may be stored. In some implementations, all references to the one or more characteristics of the identified data associated with the protected social entity are stored while, in others, only a select group of references are stored.

The security analysis engine 101 may compare one or more generated references to one or more stored references (407). In some implementations, the process may be executed by the user analysis engine 109. The user analysis engine 109 may store one or more references to characteristics of identified data associated with a protected social entity.

The user analysis engine 101 may use one or more techniques to compare generated references to identified data that is associated with a suspect social entity, to stored references to identified data that is associated with a protected social entity. The user analysis engine may compare images obtained from websites such as Wikipedia to compare to the image of the suspect social entity. The user analysis engine 109 may derive data from an image by hashing the image. The user analysis engine 109 may, for example, generate a reference to an image that is associated with a suspect social entity by deriving data from the image, and may compare the derived data with data derived from an image that is associated with a protected social entity. The user analysis engine 109 may, for example, hash an image that is associated with the suspect social entity, and may compare the hashed image with a hash of an image that is associated with a protected social entity. Through this method or by other techniques, the user analysis engine 109 may be able to detect if an image associated with a protected social entity is being used by an imposter. The user analysis engine 101 may also use facial recognition to identify individuals in images and to generate references. The facial recognition process that is executed on images can be used to recognize various characteristics of individuals in the images, including facial structure or gender.

In some implementations, the user analysis engine 109 may determine a match score for each comparison that occurs between references to characteristics associated with the protected social entity and references to characteristics associated with the suspect social entity. The user analysis engine 109 may then determine an overall profile score of a suspect social entity based on an average of the match scores of each comparison. The user analysis engine 109 may, for example, determine a match score based on a comparison of references to a name field of a protected social entity and one or more suspect social entities. The user analysis engine 109 may determine a high match score for suspect entities that have variations of the name of the protected social entity. For example, suspect entities Mike Hall, Micky Hall, Mic Hall, Mik Hall, Mick Hall, Michael H, and M Hall may be assigned a high match score for the protected social entity Michael Hall.

The user analysis engine 109 may also compare a reference to a location of a protected social entity to a reference of the location of a suspect entity. In some implementations, the location of a suspect social entity may be identified from demographic information listed on the profile page of the suspect social entity.

Following comparison of references, the user analysis engine 109 may determine a profile score of the suspected social entity (409). The profile score is a quantifiable rating that measures how closely a suspect social entity matches a protected social entity. In some implementations, the user analysis engine 109 may calculate a match score for each reference that is compared between the protected social entity and the suspect social entity. In these implementations, the profile score may be determined as the average of the match scores. In other implementations, the profile score may be determined using a different algorithm. The profile score may, for example, be determined as a weighted average of a comparison of the references between the protected social entity and the suspect social entity. A comparison of a reference to an image, for instance, may be more heavily weighted than that of a reference to the location, which may in turn be more heavily weighted than a reference to a date of birth.

Figure 5:
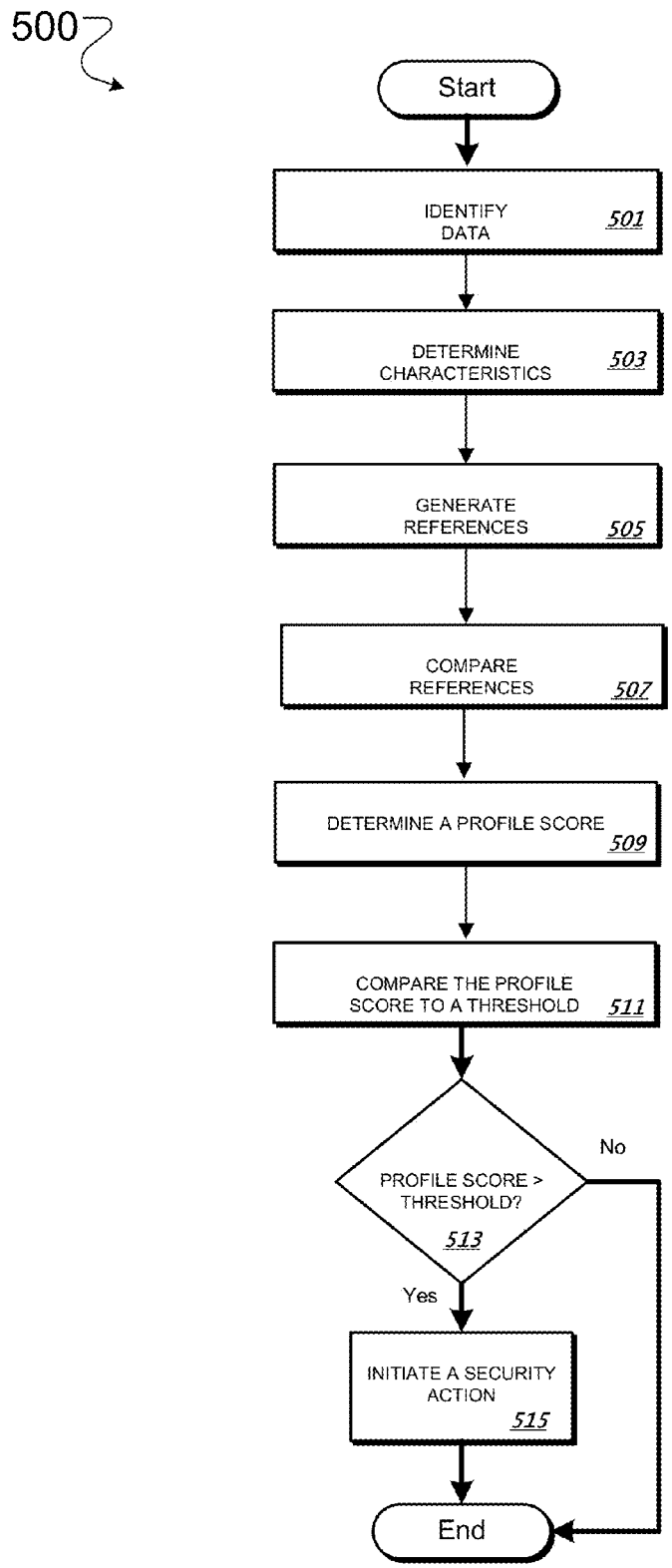
FIG. 5 is a flowchart of an example process for determining a profile score for a suspect social entity, and for initiating a security action based on the determined profile score.

FIG. 5 is a flowchart of an example process 500 for determining a profile score for a suspect social entity, and for initiating a security action based on the determined profile score. The process 500 may be implemented, for example, using system 100, although other systems or configurations may be used. In such an implementation, one or more parts of the process may be executed by security analysis engine 101, which may interface with other computers through a network. In some implementations, the process may be executed by the user analysis engine 109.

Process 500 begins when a scanner identifies data on one or more social networks that is associated with a suspect social entity (501). The scanner may be hosted at an entity that is different and separate from the user analysis engine 109. Alternatively, the scanner may be part of, or otherwise associated with, the user analysis engine 101, and may be integrated into the system 100 illustrated in FIG. 1.

The user analysis engine 109 may determine one or more characteristics of identified data (503). Characteristics that may be determined for identified data may vary depending on the type of data identified. Identified data that is associated with a suspect social entity may include, for example, the suspect social entity's user name, the suspect social entity's profile picture, date of birth, gender, location, email address, education, and organization.

Following a determination of the characteristics of the identified data, user analysis engine 109 may generate, for each of the one or more characteristics, a reference to the characteristic or to the identified data to which the characteristic pertains (505). User analysis engine 109 may, for instance, create a reference to a characteristic by tagging the characteristic. The characteristic may be tagged, for example, with a keyword or term that describes the characteristic.

The user analysis engine 109 may compare one or more generated references to one or more stored references (507). The user analysis engine 109 may store one or more references to characteristics of identified data associated with a protected social entity. The user analysis engine 109 may use one or more different techniques to compare the generated references associated with the suspect social entity to the stored references associated with the protected social entity.

Following the comparison of the references, the user analysis engine 109 may determine a profile score of the suspected social entity (509). The profile score is a quantifiable rating that measures how closely there is a match to the protected social entity, that is, how likely the suspect social entity may be considered as an entity attempting to impersonate the protected social entity.

The user analysis engine 109 may compare a profile score that is associated with the suspect entity to a profile score threshold (511), and may determine whether the profile score exceeds the profile score threshold (513). If a profile score that is associated with the social entity exceeds a profile score threshold, the security analysis engine may initiate a security action (515). If, however, the profile score that is associated with the suspect social entity does not exceed the threshold profile score, the security analysis engine may instead take no action. In some implementations, initiating a security action may include generating an alert and proving the generated alert to the protected social entity. For example, Clark Kent may receive an alert describing Clarke Kent as a suspect social entity that is an imposter. In some implementations, the alert may be a web-based alert. The alert may also be received as an email, or as a text message on a mobile device of the protected social entity. In other implementations, the protected social entity may be provided with visual alerts through a social threat protection tool that identifies suspect social entities.

Figure 6:
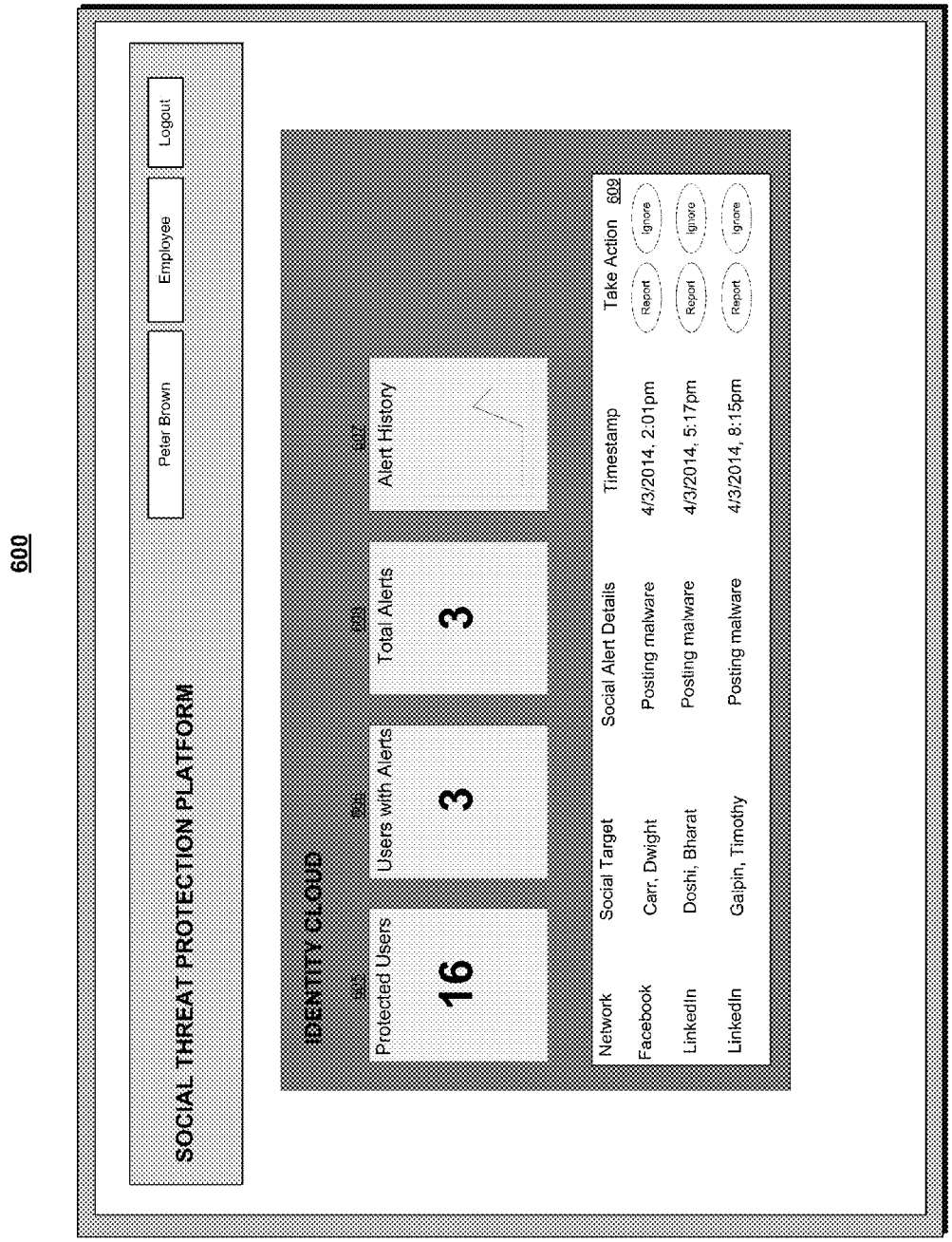
Figure 7:
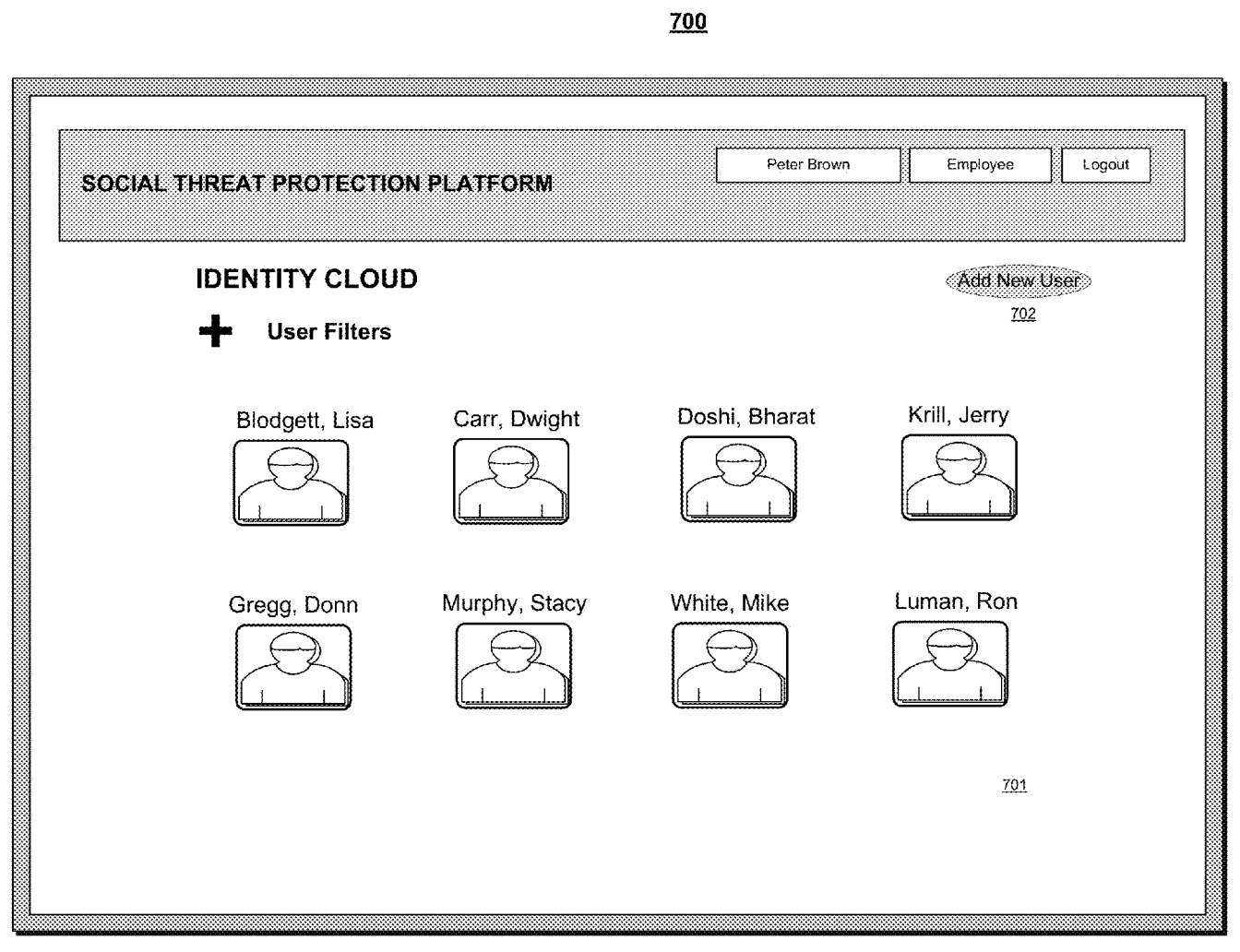
Figure 8:
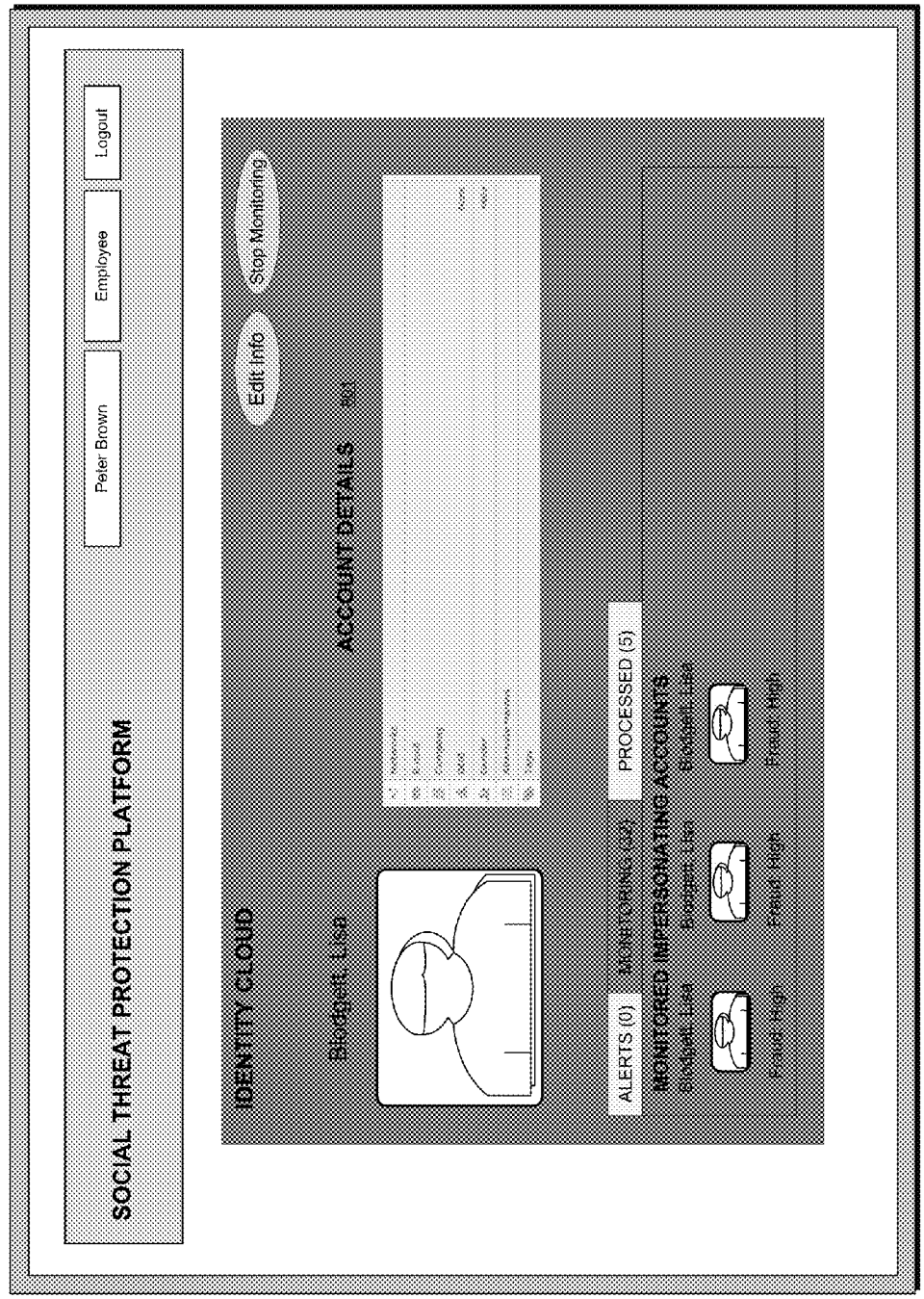

FIGS. 6, 7, and 8 are example illustrations of a social threat protection platform. The illustrated user interfaces may be displayed, for example, when an administrator of a social threat protection tool logs into the platform.

As FIG. 6 illustrates, the social threat protection platform may have one or more applications. The screenshot illustrated in FIG. 6 shows the identity page of the social threat protection tool platform. The identity page may include a number of protected users (605) that subscribe to and are protected by the social threat protection tool. The identity page may also include a number of users of the social threat protection tool that have active alerts (606), in addition to an alert history graph (607). The identity page may also include a list of the users with active alerts (608). For users with active alerts, the identity page may provide details associated with the listed alerts. The identity page may, for example, identify an imposter account that is associated with a user and that may be posting malware. The listing of alerts may also include an option for the user to ignore the alert or take an action (609).

FIG. 7 may be displayed when the administrator user selects the protected users icon 605 illustrated in FIG. 6. When selected, the social threat may full listing of protected users 701 of the social threat protection tool. The listing of protected users may include the number of alerts for each protected user, the number of imposter profiles that may be detected for each protected user and the number of processed alerts. The administrator user may have the ability to select an individual user to further observe the user's account, as illustrated in FIG. 8. The administrator user may also have the ability of adding a new user by selecting the "add new user" icon 702.

FIG. 8 may be displayed when the administrator user selects an individual user to further observe a user's account. The administrator user may then be able to view the selected user's account information details 801. The account information details that are displayed may include the user's name, date of birth, company, gender, alternate names, and any other account information stored at the databases associated with the social threat protection tool. The account information displayed may be information that was provided to the social threat protection tool by the user. In other implementations, the account information displayed may be information identified when the security analysis engine 101 associated with the social threat protection tool scans one or more social network profiles associated with the protected user. The account details may further include any images associated with the user. The user details page may also include the list of accounts that have been identified as impersonating the user as well as a list of the impersonating accounts that are being monitored and the list of impersonating accounts that have been processed. In some implementations, the user details may include the profile score associated with each impersonating account.

A number of implementations have been described. Nevertheless, it will be understood that various modifications may be made without departing from the spirit and scope of the disclosure.

In addition, logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

What is claimed is:

1. A method comprising:
   scanning data that is maintained on multiple social networks, wherein scanning data that is maintained on multiple social networks comprises identifying, by one or more processors, data that is associated with a social entity, and wherein scanning data that is maintained on multiple social networks is performed on a continuous basis, without user initiation;

determining one or more characteristics of the identified data;

generating, for each of the one or more characteristics, a reference to the identified data that indicates the characteristic;

comparing one or more of the generated references to one or more stored references, wherein the one or more stored references are references to one or more characteristics associated with a protected user;

determining, based on an algorithmic comparison of the one or more generated references and the one or more stored references, a profile score for the suspect social entity, wherein determining the profile score comprises identifying a match between one or more of the generated references and one or more of the stored references, wherein the one or more generated references that are compared to the one or more stored references are dynamically determined, being selected from a group of generated references, and wherein the algorithmic comparison comprises:

determining one or more match scores by comparing the one or more generated references to the one or more stored references;
   generating a weight for each match score; and
   generating a weighted average based on the weighted match scores;

comparing the profile score for the suspect social entity determined by the algorithmic comparison to a threshold;

identifying the suspect social entity as an imposter of the protected social entity if the profile score exceeds the threshold;

monitoring the activity of the identified imposter across the multiple social networks, wherein monitoring the activity of the identified imposter comprises identifying data that is associated with the identified imposter;

determining that the identified data associated with the identified imposter is malicious;

generating an alert; and providing the alert to the protected social entity.

2. The method of claim 1 wherein the alert identifies the suspect social entity.

3. The method of claim 1 wherein providing the alert to the protected social entity comprises providing a computer-based alert to the protected social entity.

4. The method of claim 3 wherein providing a computer-based alert to the protected social entity comprises emailing the protected social entity.

5. The method of claim 3 wherein providing a computer-based alert to the protected social entity comprises providing a web-based alert to the protected social entity.

6. The method of claim 1 wherein the alert indicates fraud, impersonation, or social engineering.

7. The method of claim 1, wherein the group of generated references includes generated references that indicate name, date of birth, gender, location, email address, education, and organization.

8. The method of claim 1, wherein the one or more characteristics include an image, and wherein generating a reference to the image comprises deriving data from the image.

9. The method of claim 8, wherein deriving data from the image comprises hashing the image for comparison.

10. The method of claim 8, wherein deriving data from the image comprises determining one or more facial characteristics of an individual included in the image.

11. The method of claim 1, wherein the algorithmic comparison comprises generation of a weighted average.

12. A system comprising:
one or more processing devices; and
one or more non-transitory computer-readable media coupled to the one or more processing devices having instructions stored thereon which, when executed by the one or more processing devices, cause the one or more processing devices to perform operations comprising:

scanning data that is maintained on multiple social networks, wherein scanning data that is maintained on multiple social networks comprises identifying, by one or more processors, data that is associated with a social entity, and wherein scanning data that is maintained on multiple social networks is performed on a continuous basis, without user initiation;

determining one or more characteristics of the identified data;

generating, for each of the one or more characteristics, a reference to the identified data that indicates the characteristic;

comparing one or more of the generated references to one or more stored references, wherein the one or more stored references are references to one or more characteristics associated with a protected user; and determining, based on an algorithmic comparison of the one or more generated references and the one or more stored references, a profile score for the suspect social entity, wherein determining the profile score comprises identifying a match between one or more of the generated references and one or more of the stored references, wherein the one or more generated references that are compared to the one or more stored references are dynamically determined, being selected from a group of generated references, and wherein the algorithmic comparison comprises:

determining one or more match scores by comparing the one or more generated references to the one or more stored references;
   generating a weight for each match score; and
   generating a weighted average based on the weighted match scores;

comparing the profile score for the suspect social entity determined by the algorithmic comparison to a threshold;

identifying the suspect social entity as an imposter of the protected social entity if the profile score exceeds the threshold;

monitoring the activity of the identified imposter across the multiple social networks, wherein monitoring the activity of the identified imposter comprises identifying data that is associated with the identified imposter;

determining that the identified data associated with the identified imposter is malicious;

generating an alert; and providing the alert to the protected social entity.

13. The system of claim 12 wherein the alert identifies the suspect social entity.

14. The system of claim 12 wherein providing the alert to the protected social entity comprises providing a computer-based alert to the protected social entity.

15. The system of claim of 14 wherein providing the alert to the protected social entity comprises emailing the protected social entity.

16. The system of claim 14 wherein providing computer-based alerts to the protected social entity comprises providing a web-based alert to the protected social entity.

17. The system of claim 12 wherein the alert indicates fraud, impersonation, or social engineering.

18. The system of claim 12, wherein the group of generated references includes generated references that indicate name, date of birth, gender, location, email address, education, and organization.

19. The system of claim 12, wherein the one or more characteristics include an image, and wherein generating a reference to the image comprises deriving data from the image.

20. The system of claim 19, wherein deriving data from the image comprises hashing the image.

21. The system of claim 19, wherein deriving data from the image comprises determining one or more facial characteristics of an individual included in the image.

22. A non-transitory computer-readable storage medium storing software comprising instructions executable by one or more computers which, upon such execution, cause the one or more computers to perform operations comprising:

scanning data that is maintained on multiple social networks, wherein scanning data that is maintained on multiple social networks comprises identifying, by one or more processors, data that is associated with a social entity, and wherein scanning data that is maintained on multiple social networks is performed on a continuous basis, without user initiation;

determining one or more characteristics of the identified data;

generating, for each of the one or more characteristics, a reference to the identified data that indicates the characteristic;

comparing one or more of the generated references to one or more stored references, wherein the one or more stored references are references to one or more characteristics associated with a protected user; and determining, based on an algorithmic comparison of the one or more generated references and the one or more stored references, a profile score for the suspect social entity, wherein determining the profile score comprises identifying a match between one or more of the generated references and one or more of the stored references, wherein the one or more generated references that are compared to the one or more stored references are dynamically determined, being selected from a group of generated references, and wherein the algorithmic comparison comprises:

determining one or more match scores by comparing the one or more generated references to the one or more stored references;

generating a weight for each match score; and generating a weighted average based on the weighted match scores;

comparing the profile score for the suspect social entity determined by the algorithmic comparison to a threshold;

identifying the suspect social entity as an imposter of the protected social entity if the profile score exceeds the threshold;

monitoring the activity of the identified imposter across the multiple social networks, wherein monitoring the activity of the identified imposter comprises identifying data that is associated with the identified imposter;

determining that the identified data associated with the identified imposter is malicious;

generating an alert; and providing the alert to the protected social entity.

\* \* \* \* \*